United States Statutory Invention Registration [19]

[11] Reg. Number: H404

Sayles [43] Published: Jan. 5, 1988

[54] DISPOSAL OF INORGANIC CHEMICAL WASTES

[75] Inventor: David C. Sayles, Huntsville, Ala.

[73] Assignee: The United States of America as represented by the Secretary of the Army, Washington, D.C.

[21] Appl. No.: 60,797

[22] Filed: Jun. 12, 1987

[51] Int. Cl.[4] ..... B09B 1/00; G21F 9/00

[52] U.S. Cl. ..... 405/128

*Primary Examiner*—John F. Terapane
*Assistant Examiner*—Susan Wolffe
*Attorney, Agent, or Firm*—John C. Garvin, Jr.; Freddie M. Bush

[57] ABSTRACT

Recovery and disposing of waste materials containing inorganic chemicals cannot be effected by incineration to meet environmental regulations as is the situation with waste organic materials. As long as the inorganic toxic materials are in some soluble form, they can pollute the environment, and, also, end up in the water supplies. Two different disposal methods are disclosed wherein one method is effective for removing the insoluble inorganic salts by converting them into mesylates by reaction with methanesulfonic acid or with methanedisulfonic acid. Most mesylate salts are highly soluble in aqueous and certain organic systems. As an illustration, 1.0 part of silver mesylate or 2.0 parts of stannous mesylate or lead(II) mesylate will dissolve in 1.0 part of water at room temperature. This unique solubilizing property offers the ability of leaching such toxic metal contaminants as lead, cadmium, etc. from sewage sludge. The metal salts can thus be recovered and recycled. The other method relates to preparing the waste material for a safe burial without concern of contaminating the environment. This method is achieved by the following procedure: any acidic waste inorganic material is neutralized using a slurry of slaked lime. The neutralized material is then combined with the remainder of the waste material. The waste material is transferred to a polyethylene bag which is used to line the inside of a container. The waste material is then placed in the polyethylene bag, and mixed with enough sand and portland cement to produce a mixture that will harden overnight. The resulting block of concrete, contained within the polyethylene bag, can be buried safely without concern of contaminating the environment.

3 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DISPOSAL OF INORGANIC CHEMICAL WASTES

DEDICATORY CLAUSE

The invention described herein may be manufactured, used, and licensed by or for the Government for governmental purposes without the payment to me of any royalties thereon.

BACKGROUND OF INVENTION

The disposal of waste materials containing inorganic chemicals cannot be effected by incineration as is the situation with typical organic waste materials. Typical organic waste material when burned yield gaseous products which can be safely disposed of in accordance with environmental regulations. To the contrary, inorganic materials having toxic components when burned can still yield toxic products which are in some soluble form which make them conducive to polluting the environment, and also ending up in the water supplies.

Thus, there is an immediate need for an effective method of removing the insoluble inorganic salts from waste materials such as sewage sludge.

Therefore, an object of this invention is to provide a method for removing insoluble inorganic salts from waste materials by converting them to a soluble form which can be recovered and recycled or which can be safely disposed of without contaminating the environment.

A further object of this invention is to provide a method which converts insoluble inorganic salts into highly soluble acidic products which are soluble in aqueous and selected organic systems.

Still a further object of this invention is to provide a method which converts waste portions of inorganic material to a neutralized form which is subsequently converted to a solid form which can be buried safely without concern of contaminating the environment.

SUMMARY OF THE INVENTION

Insoluble inorganic salts of waste materials are effectively removed from the waste materials by reacting, while agitating the waste materials with methanesulfonic acid or methanedisulfonic acid to convert them into mesylates. The mesylate salts are highly soluble in aqueous and selected organic systems.

The unique solubilizing property of the mesylates offers the ability of extracting such toxic metal contaminants as lead, cadmium, etc. from sewage sludge. The metal salts can thus be removed and recycled.

Another or alternate disposal method for waste inorganic material is achieved by the procedure which includes neutralizing any acidic inorganic waste material with a slurry of slaked lime. The neutralized material is then combined with the remainder of the waste material. The waste material is transferred to a polyethylene bag which is used to line the inside of a container. A mixture of enough sand and Portland cement is added and mixed to produce a mixture that hardens overnight. The resulting block of concrete, contained within the polyethylene bag, is buried safely without concern of contaminating the environment.

DESCRIPTION OF THE PREFERRED EMBODIMENT

Inorganic salts contained in waste material such as sewage sludge are effectively removed or disposed of by two different methods.

Method 1 is preferred where the toxic metal contaminants such as lead, cadmium, etc. are desired to be removed, recovered and recycled. Method 2 is preferred where the toxic metals are other inorganic salt materials are not desired to be recovered, but are desired to be safely buried without concern of contaminating the environment.

Methanesulfonic acid ($CH_3SO_2OH$) and methanedisulfonic acid $CH_2(SO_2OH)_2$ are effective in removing the insoluble inorganic salts by converting them into mesylates. The mesylates salts which contain the toxic metal components of the waste materials are highly soluble in aqueous and certain organic systems.

EXAMPLE I

Sludge or the waste material in a slurry form is treated while being agitated with a stoichiometric excess of a methanesulfonic acid to yield metal mesylates which are highly soluble in water. As an illustration, 1.0 part of silver mesylate or 2.0 parts of stannous mesylate or lead(II) mesylate will dissolve in 1.0 part of water at room temperature. Other insoluble inorganic salts containing toxic metal contaminants as lead, cadmium, zinc, beryllium, chromium, nickel, vanadium, thallium, and etc., are extracted from sewage sludge. The metals of the salts can be recovered and recycled.

EXAMPLE II

Acidic inorganic materials contained in waste are disposed of by the following procedure: any waste acidic inorganic material is neutralized using a slurry of slaked lime. The neutralized material is then combined with the remainder of the waste material. The waste material is transferred to a polyethylene bag which is used to line the inside of a container. The waste material is then placed in the polyethylene bag, and mixed with enough sand and Portland cement to produce a mixture that will harden overnight. The resulting block of concrete, contained within the polyethylene bag, can be buried safely without concern of contaminating the environment.

I claim:

1. A method of disposal of waste inorganic chemical material containing insoluble inorganic salts of toxic metals, said method comprising:
   (i) treating said inorganic chemical waste material in the form of a slurry while being agitated with an excess of a stoichiometric amount of a compound selected from the compounds consisting of methanesulfonic acid and methanedisulfonic acid to convert said insoluble inorganic salts of toxic metals into metal mesylates;
   (ii) solublizing said metal mesylates in an aqueous or a polar organic solvent system; and,
   (iii) recovering said metal mesylates which contain toxic metals leached from said inorganic chemical waste materials.

2. The method of claim 1 wherein said inorganic chemical waste material is in the form of sewage sludge and wherein said insoluble inorganic salts contain the toxic metals comprising lead, cadmium, zinc, beryllium, chromium, nickel, vanadium, and thallium.

3. A method of disposal of acidic organic chemical waste material which comprises;

(i) neutralizing while agitating a portion of said acidic inorganic chemical waste material using a slurry of slaked lime;

(ii) combining a remaining portion of said acidic inorganic chemical waste material in sufficient quantity to retain neutrality of the combined said portions and said slurry of slaked lime;

(iii) transferring said neutralized acidic inorganic chemical waste material to a polyethylene bag which is used to line the inside of a container; and (iv) combining a sufficient amount of sand and portland cement with said neutralized acidic inorganic chemical waste material to produce a mixture that will harden overnight to form a block of concrete, contained within said polyethylene bag and in a suitable form for being buried safely without concern of contaminating the environment.

* * * * *